United States Patent [19]

Goodman et al.

[11] 4,455,276

[45] Jun. 19, 1984

[54] ELECTRICALLY CHARGED TARGETS

[75] Inventors: Ronald K. Goodman, Livermore; Angus L. Hunt, Alamo, both of Calif.

[73] Assignee: The United States of America as represented by the United States Department of Energy, Washington, D.C.

[21] Appl. No.: 943,903

[22] Filed: Sep. 19, 1978

Related U.S. Application Data

[62] Division of Ser. No. 698,557, Jun. 22, 1976, Pat. No. 4,138,609.

[51] Int. Cl.³ .......................... G21B 1/00; G21C 3/00
[52] U.S. Cl. .................................................. 376/152
[58] Field of Search ............................ 176/1; 204/177; 376/152

[56] References Cited

U.S. PATENT DOCUMENTS

| | | | |
|---|---|---|---|
| 3,152,056 | 10/1964 | Berghaus et al. | 204/177 |
| 3,755,073 | 8/1973 | Haught et al. | 176/1 |
| 3,953,617 | 4/1976 | Smith et al. | 176/1 |
| 3,987,590 | 10/1976 | Chianelli | 176/1 |

OTHER PUBLICATIONS

UCRL-50002-74, 10/74, pp. 17-19, 33-37.
UCRL-52000-76-1, 1/76, pp. 7-9.
UCRL-50002-75, 10/75, pp. 21-34.
J. of Physics E-Scientific Instruments vol. 7, 1974 pp. 715-718, Schwenn et al.

*Primary Examiner*—Harvey E. Behrend
*Attorney, Agent, or Firm*—L. E. Carnahan; Roger S. Gaither

[57] ABSTRACT

Electrically chargeable laser targets and method for forming such charged targets in order to improve their guidance along a predetermined desired trajectory. This is accomplished by the incorporation of a small amount of an additive to the target material which will increase the electrical conductivity thereof, and thereby enhance the charge placed upon the target material for guidance thereof by electrostatic or magnetic steering mechanisms, without adversely affecting the target when illuminated by laser energy.

3 Claims, 1 Drawing Figure

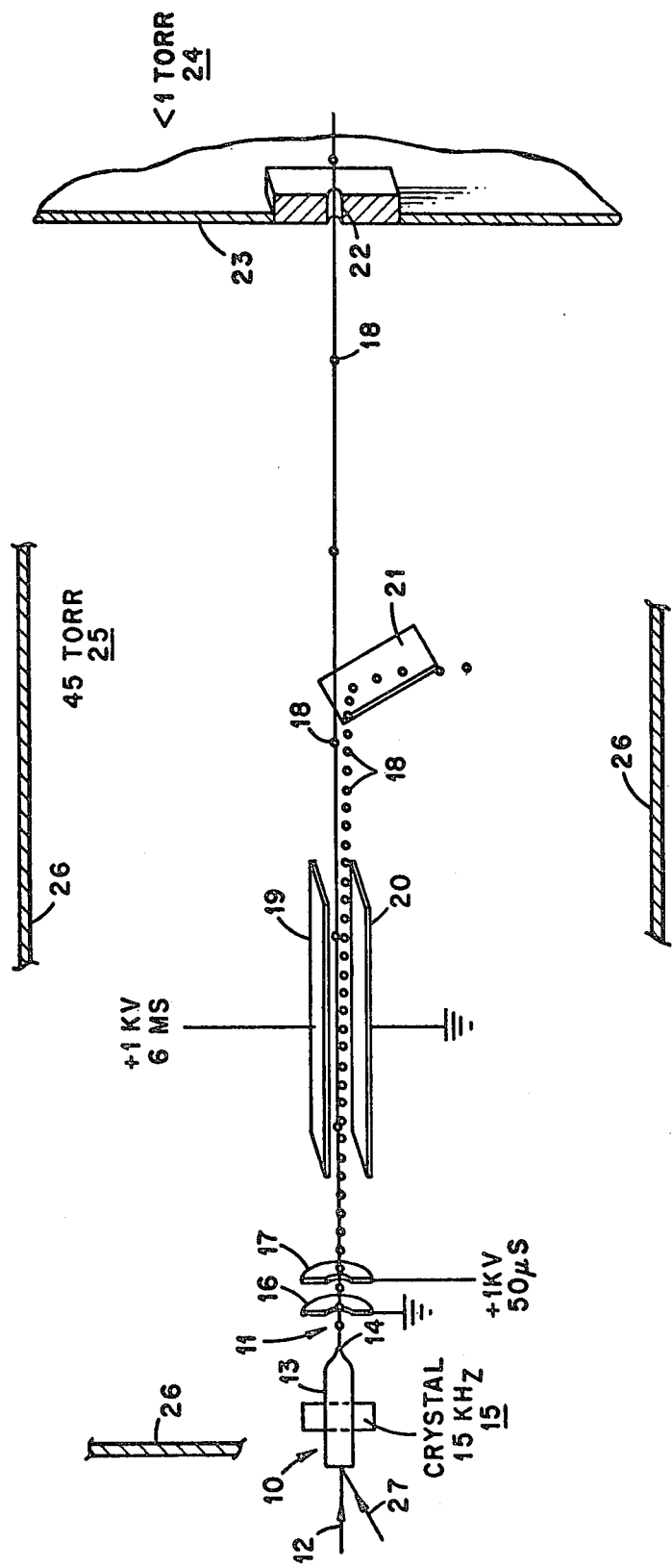

ELECTRICALLY CHARGED TARGETS

The invention described herein was made in the course of, or under, Contract No. W-7405-Eng48, with the United States Energy Research and Development Administration.

This is a division of application Ser. No. 698,557, filed June 22, 1976, now U.S. Pat. No. 4,138,609, issued Feb. 6, 1979.

BACKGROUND OF THE INVENTION

This invention relates to laser targets, and more particularly to electrically chargeable laser targets and method for forming such charged targets.

In certain magnetic confinement CTR systems, energetic neutral beams are injected and trapped by interaction with a target plasma. These target plasmas are generated by introducing into the confinement region a solid target or pellet of appropriate material which is vaporized and ionized by means of laser beams. This requires the capability to accurately guide the target to the desired focal spot. The standard way of accomplishing this task is to place an electrical charge on the target, whereby the trajectory can be influenced by standard electrostatic and/or magnetic means. Articles by C. D. Hendricks entitled "Charged Droplet Experiments", Journal of Colloid Science, vol. 17, No. 3, March 1962; and "Micron and Submicron Particle Production", IEEE Transactions On Industry Applications, Vol. 1A-10, No. 4, July/August 1974, pp. 508-510, exemplify prior known techniques in the forming of charged particles or targets. Also, the production of pellets using a fluid jet process is taught by J. M. Schneider et al., Rev. Sci. Inst. 35, 1349, 1964.

The ability to guide a target or pellet is directly related to the magnitude of the charge carried by a target. Accordingly, a target must have a relatively high electrical charge so as to be effectively guided or directed by guidance apparatus, such as that exemplified in U.S. Pat. No. 3,582,958 issued June 1, 1971 in the name of C. D. Hendricks, Jr.; and an article by J. R. Adam et al. entitled, "The Collision, Coalescence, and Disruption of Water Droplets", Journal of Applied Physics, Vol. 39, No. 11, 5173-5180, October, 1968. Thus, a need exists for a method of imparting a relatively high electrical charge upon a target and to do so without application of undue voltages which might produce breakdown of the atmosphere in the target-generating chamber, since the charge on the targets which can be achieved by prior known means is below the value required by electronic guidance systems for effective guidance off the targets.

SUMMARY OF THE INVENTION

The present invention provides a solution to the limited charge problem on laser targets for effective guidance. In general, the invention involves an electrically chargeable target formed by incorporating into the target material an additive which will raise the electrical conductivity of the target material. For example, in magnetic confinement CTR applications wherein the target material is ammonia, the addition of dilute hydrochloric acid (HCl) increases the conductivity ratio of the ammonia by two orders of magnitude. Similarly, the invention is applicable to laser fusion type targets wherein the target trajectory is controlled by electrostatic or magnetic guidance mechanism. Thus, the present invention provides a way to impart relatively high electrical charges upon a pellet or target, and to do so without application of undue voltages which might produce breakdown of the atmosphere in the target-generating chamber.

Therefore, it is an object of the invention to provide an electrically chargeable laser target.

A further object of the invention is to provide a laser target of improved chargeability for improving guidance thereof along a predetermined trajectory.

Another object of the invention is to provide a method for forming improved electrically charged laser targets.

Another object of the invention is to provide a method for forming electrically charged laser target by incorporating into the target material an electrically conductive additive such that relatively high electrical charges can be imparted to the target.

Other objects of the invention will become readily apparent from the following description and accompanying drawing.

BRIEF DESCRIPTION OF THE DRAWING

The single FIGURE schematically illustrates a pellet or target generator for producing the electrically chargeable targets of the invention.

DESCRIPTION OF THE INVENTION

The invention overcomes the limited charge problem of laser targets whereby such targets can be effectively guided along a desired trajectory via an electrostatic or magnetic guidance system. Broadly the invention involves an electrically chargeable laser target and method of forming such charged targets. More specifically the target of this invention is formed by the incorporation into the target material of an additive which increases the electrical conductivity of the target, thereby enhancing the charge placed upon the target without application of undue voltages which might produce breakdown of the atmosphere in the target-generating chamber.

The mechanism for forming prior known laser targets for a magnetic confinement CTR system, for example, is shown in the drawing, generally indicated at 10, and comprises a stream of liquid 11 with a desired periodic restriction in diameter formed from a source of liquid under pressure indicated by arrow 12 directed through a housing or channel 13 defining a liquid channel terminating in an orifice 14 forming a $10^{-2}$ cm diameter opening, and having a piezoelectric means 15, such as a crystal, positioned about channel 13 for impressing upon the liquid a pressure wave of desired amplitude and frequency, such as 15 KHz. The liquid 12 may be ammonia, for example. The liquid stream 11 emitted from orifice 14, which is at this point still substantially continuous, passes through apertures in a pair of spaced electrically conductive plates 16 and 17 having voltage pulses of about 1 Kv at 50 $\mu$sec, for example, impressed thereacross, wherby the liquid segment between the plates is polarized, i.e., it becomes positively and negatively charged at the respective ends of the liquid segment near the plates 16 and 17. When the stream 11 breaks up into drops, the drops formed from these respective end sections retain the induced charges. For example, plates 16 and 17 may be spaced 1.0 cm from each other, and with the velocity of stream 11 being about 13 m/sec, about 1 drop having a diameter of about $2 \times 10^{-2}$ cm is formed by each liquid segment between the plates during a 50 μsec pulse with an overall production of an arbitrary number, up to crystal frequency, of drops per min. The thus formed drops become targets or pellets 18 which pass between a pair of spaced deflection plates 19 and 20 having for example, a voltage of 1 Kv impressed thereacross such that a desired number of targets 18 at selected spaced intervals are deflected from the stream of such targets past a barrier or baffle 21 and directed through an aperture 22 in wall 23 into a magnetic confinement chamber 24 or outer point of use. The magnitude of the charge placed on the drops formed from the end sections of each liquid segment is limited by the magnitude of the electric field of plates 16 and 17, which in turn is limited by the breakdown threshold of the background gas between the plates. As shown the target generating mechanism 10, deflection plates 19 and 20, and barrier 21 are located within an evacuated chamber 25 formed by a housing 26, said chamber 25 having a pressure of 45 Torr, for example, while confinement chamber 24 has for example a pressure of <1 Torr, with wall 23 being common to chamber 25 and chamber 24.

As pointed out above, the problem is that the charge on the targets 18, as they pass through plates 16 and 17, which can be achieved by conventional means is below the value required for effective guidance thereof by electronic (electrostatic or magnetic) target guidance systems.

The present invention provides a solution to this limited charge problem without modification of the target generating apparatus such as illustrated in the drawing. In general, the invention is to incorporate in the liquid material 12 an additive which will, with small concentrations, raise the electrical conductivity of the liquid medium. In the case of ammonia as the liquid 12, as exemplified above, the additive comprises dilute (~0.4%) of 37% hydrochloric acid (HCl) in water, introduced into the anhydrous ammonia stream, as indicated by arrow 27, at a rate of less than 3% per volume. This increases the conductivity ratio of the ammonia by two orders of magnitude, and produces a proportional increase in he charge density per drop or target 18.

It has thus been seen that the present invention provides an electrically chargeable laser target and method of forming same which has application in both the magnetic confinement CTR and laser fusion CTR systems, and which overcomes the limited charge problem associated with such targets which are guided along a predetermined trajectory by electrostatic, magnetic, or similar guidance mechanism.

While particular materials, parameters, and apparatus have been described and/or illustrated modifications and changes will become apparent to those skilled in the art, and it is intended to cover in the appended claims all such modifications and changes that come within the spirit and scope of the invention.

What we claim is:

1. An electrically charged laser target capable of being at least vaporized and ionized by laser energy for producing a plasma comprising: a quantity of liquid material composed essentially of anhydrous ammonia and an additive means for significantly increasing the electrical conductivity of said anhydrous ammonia and for enhancing the guidance capability of the target material by electronic guidance systems said additive means being composed of dilute HCl.

2. The target defined in claim 1, wherein said additive comprises about 0.4% of 37% HCl in water mixed with ammonia at a rate of less than 3% per volume.

3. The target defined in claim 1 formed by a process comprising the steps of: mixing about 0.4% HCl in water with anhydrous ammonia at a rate of less than 3% per volume, forming drops of the mixture, and inducing an electrical charge on the thus formed drops producing electrically charged targets.

* * * * *